(12) United States Patent
Langhans et al.

(10) Patent No.: US 7,300,584 B2
(45) Date of Patent: Nov. 27, 2007

(54) TREATMENT OF A SUSPENSION IN A BIOREACTOR WITH INTEGRATED HYDRAULIC BOTTOM LAYER REMOVAL

(75) Inventors: Gerhard Langhans, Dresden (DE); Matthias Herms, Dresden (DE); Thomas Buechner, Kreischa (DE)

(73) Assignee: Linde-KCA-Dresden GmbH, Dresden (DE)

( * ) Notice: Subject to any disclaimer, the term of this patent is extended or adjusted under 35 U.S.C. 154(b) by 179 days.

(21) Appl. No.: 10/883,977

(22) Filed: Jul. 6, 2004

(65) Prior Publication Data

US 2005/0126997 A1   Jun. 16, 2005

Related U.S. Application Data

(63) Continuation-in-part of application No. 10/743,318, filed on Dec. 23, 2003, now abandoned.

(30) Foreign Application Priority Data

Dec. 11, 2003   (DE) ................. 103 58 400

(51) Int. Cl.
    *C02F 3/00*   (2006.01)
(52) U.S. Cl. ..................................... 210/629
(58) Field of Classification Search ................ 210/601, 210/629
    See application file for complete search history.

(56) References Cited

U.S. PATENT DOCUMENTS

| 5,089,118 | A |   | 2/1992 | Mahoney et al. |
| 5,409,610 | A |   | 4/1995 | Clark et al. |
| 5,942,116 | A |   | 8/1999 | Clark et al. |
| 6,086,765 | A | * | 7/2000 | Edwards ............ 210/605 |
| 6,793,814 | B2 | * | 9/2004 | Fout et al. ............ 210/188 |

FOREIGN PATENT DOCUMENTS

EP          90335 A2 * 10/1983

* cited by examiner

*Primary Examiner*—Chester T. Barry
(74) *Attorney, Agent, or Firm*—Millen, White, Zelano & Branigan, P.C.

(57) ABSTRACT

A process and a device for biological treatment of a suspension in a bioreactor (2) are described. To circulate the suspension, at least some of the suspension is routed through a vertically aligned guide zone (5) so that a vertical flow of the suspension is produced. To control sediment problems, it is suggested that by feeding a fluid, especially a free liquid jet, via at least one nozzle (11), a horizontal flow is superimposed on the vertical flow in the vicinity of the bottom of the bioreactor (2), by which a spiral flow to the central outlet area of the bioreactor (2) is produced (FIG. 1).

24 Claims, 3 Drawing Sheets

TREATMENT OF A SUSPENSION IN A BIOREACTOR WITH INTEGRATED HYDRAULIC BOTTOM LAYER REMOVAL

CROSS REFERENCE TO RELATED APPLICATION

This application is a continuation-in-part of U.S. Ser. No. 10/743,318 filed Dec. 23, 2003 now abandoned and claims priority to German Application No. 103 58 400.5.

This application is also related to a concurrently filed application entitled "Process and Device For Biological Treatment Of A Suspension In A Bioreactor With Integrated Hydraulic Top Scum Treatment" (Attorney Docket No. LINDE-0616 P1) by the identical inventors.

SUMMARY OF THE INVENTION

The invention relates to a process for biological treatment of a suspension in a bioreactor that has a central outlet area near the bottom and in which to circulate the suspension at least some of the suspension is routed through a substantially vertically aligned guide zone so that a substantially vertical flow of at least a portion of the suspension is produced, which flow extends into the vicinity of the bottom of the bioreactor or proceeds from the vicinity of the bottom of the bioreactor. The invention also relates to a device for carrying out the process.

Processes for biological treatment of suspensions are, e.g., aerobic or anaerobic processes for biological treatment of waste water, sewage sludge or waste, in which the biodegradable substances contained in the suspension are decomposed by microorganisms.

Processes for biogas recovery are defined below as the anaerobic treatment of suspensions containing biodegradable materials, especially the fermentation of waste or sludge digestion in the treatment of sewage sludge. The biodegradable materials that are also called fermentation media are fermented into biogas in a bioreactor called a fermentation reactor with the exclusion of air. Often mechanical stirring systems or hydraulic recirculation systems are used to thoroughly mix the fermentation medium in the fermentation reactor. Injecting gas into the vicinity of the bottom of the fermentation reactor is also used in various ways.

In so-called loop reactors, a gas is injected into a central guide pipe located within the fermentation reactor, by which the fermentation medium is drawn into the guide pipe. In this way, e.g., the fermentation medium can be conveyed by the guide pipe from the vicinity of the bottom of the fermentation reactor to the surface of the fermentation medium contained in the fermentation reactor. Thus, at least most of the fermentation medium can be circulated in the fermentation reactor. Such a system is described in, e.g., DE 197 25 823 A1. In addition to the important feature that there are no moving parts in the fermentation reactor, this system offers still other advantages. For example, low-gradient, thorough mixing is achieved via the vertical loop. Moreover, the possibility of integrating a heat exchanger into the fermentation reactor in the form of a double-jacketed pipe through which hot water flows is offered. By blowing gas into the guide pipe, so-called loop flow forms, which has associated with it some surface surge flow formation and turbulent bottom mixing, where the surface flow is pointed radially outward, and the formation of surface scum is controlled. As a result of the defined flow conditions near the bottom which provide sediment transport in the direction of the central bottom outlet, the formation of sediment deposits commonly is also prevented.

In practical operation, however, it has been shown that for special sludge and waste qualities supplied to the fermentation reactor in a system-specific manner, surface layer and sediment problems can occur that require additional control measures.

Special type of sludges may have a higher content of detergents and fine-fibrous plastic and cellulose particles, which usually result from community waste water treatment or special commercial organic residues, and/or maybe more highly viscous sludges, and/or have solid particles that are larger depending on origin, for example, may contain glass fragments and/or other irregularly shaped inert particles.

For the initial materials, Rotational skimming can take place with collection in the outer area of the fermentation surface in the reactor where the radially decaying turbulence is no longer sufficient for bottom mixing. For sediments that are dissimilar to sand (rounded quartz grains), entanglement of the particles by their irregular fracture edges can occur; this means increased resistance to hydraulic transport to the center bottom discharge point.

Thus, an aspect of the invention is a process and apparatus of the initially mentioned type wherein sediment problems are ameliorated.

Upon further study of the disclosure, other aspects and advantages of the invention will become apparent.

From a process standpoint, in accordance with the invention, the sediment problems are ameliorated by feeding a substantially horizontal flow superimposed on the substantially vertical flow in the vicinity of the bottom of the bioreactor, by which a spiral flow to the central outlet area of the bioreactor is established.

The basic idea of the invention, therefore, comprises superimposing a hydraulic jet system on the gas-induced loop reactor principle. In this way, the process-engineering advantages of a loop reactor with a guide pipe and gas injection can be used and at the same time problem cases that occur depending on the media are controlled by cyclic operation of the hydraulic system without significantly increasing the addition of energy to the bioreactor system.

A free liquid jet injected into the bioreactor in the area of the bottom causes rotation of the liquid mass near the bottom. Spiral flow to the reactor center is formed from the superposition of the liquid flow of the vertical loop, which flow is pointed downstream and in the vicinity of the bottom toward the center, on rotation near the bottom. The additional flow in the area of the reactor near the wall, where the loop flow is lower and thus sediment deposits become possible, supports particle transport toward the middle of the reactor into the withdrawal area. This is achieved by the so-called "teacup effect" since according to the Bernoulli equation of hydrodynamics, a local pressure drop and centripetal forces in this direction are formed.

In bioreactors with up to 8000 $m^3/h$ of reaction volume and diameters of up to 22 m, it is sufficient to deliver the fluid into the bioreactor with a flow velocity of 10 to 15 m/s, preferably as a free liquid jet. Moreover, the fluid is preferably fed into the bioreactor with a volumetric flow rate of 300 to 600 $m^3/h$. In this way, the necessary pulsed flow is produced in order to have the liquid mass near the bottom rotate at roughly 0.3 m/s to 1.0 m/s, preferably, 0.5 m/s near the tank wall. Furthermore, it has proven especially favorable to feed the fluid into the bioreactor at an angle of 40° to 60° with respect to the radius in order to induce the necessary torque. Furthermore, feeding the fluid into the reactor at a downward tilt angle with respect to the horizontal of >0 to 10° can compensate the media-induced buoyancy forces in the jet field (gas inclusions). Advantageously, a portion of the suspension suctioned off from the bioreactor is preferably used as the fluid and fed into the bioreactor as a free liquid jet via a nozzle.

For irregularly shaped solid particles, the global liquid motion is not sufficient to lift the sedimented particles again. Surprisingly enough, however, it was found that in the area of the active free jet region with a local velocity of greater than the average liquid velocity, bottom sediments are clearly reduced compared to the other deposition area. Here, the conformity to the laws of debris motion takes effect, in which according to the "Magnus effect," rolling particle motion on the bottom induces a vertical buoyancy force on the particle that lifts it locally and thus again moves it into the flow field that is pointed toward the center.

In the sum of these motion processes, sediments near the edge move toward the reactor middle. These effects are supported by a tilt built into the bottom foundation toward the tank center, preferably at an angle of 10 to 20° in order to be able to use conventional foundation-laying techniques.

The free liquid jet is advantageously produced via an externally mounted pump that withdraws the required amount of liquid from the reactor and transports it back again via the nozzle.

In order to ensure the described Magnus effect over the entire periphery of the tank, the fluid is preferably fed into the bioreactor via several nozzles that are distributed in the vicinity of the bottom on the periphery of the bioreactor. Depending on the reactor size, there are, for example, 1 to 5 nozzles at the corresponding distances on the periphery of the bioreactor.

Simultaneous operation of the nozzles would mean two to five times the energy consumption for the supplementary hydraulic system. Surprisingly enough, however, it was found that the described effect can also be achieved for time-staggered operation of the bottom nozzles since particles that have settled in the meantime can again be further transported according to the effect. According to one especially preferred embodiment of the invention, therefore, all installed nozzles are connected to one pump and are successively supplied from the latter by means of cyclic switching. This makes possible an efficient and low-maintenance mode of operation.

If defined circulation of sedimentable particles from the bioreactor is required, a hydrocyclone that is dimensioned according to the desired degree of settling can be incorporated into the pump line for the free jet system. Advantageously then, the intake line of the pump is routed toward the center of the bottom of the bioreactor where the media fraction that is enriched with sediment is located.

According to a further development of the idea of the invention, intensified top scum treatment takes place likewise via nozzle systems that are located near the surface of the suspension on the periphery of the tank. Here, the fluid that is suctioned off from the bioreactor is fed into the bioreactor in part or in a time sequence in addition via at least one nozzle provided in the area of the suspension fill level such that the surface of the suspension and/or the top scum floating on the surface of the suspension is forced into rotary flow. Preferably, the fluid is fed into the bioreactor via nozzles that are located substantially tangentially on the periphery in the upper region of the tank. Here, the nozzles can be supplied from the same pump as the nozzles located in the vicinity of the bottom. Such a hydraulic connection via a common pump is especially recommended when the on cycles required for the top nozzles are not very substantial, such that one or two additional on cycles can be assigned to the bottom nozzles for each on cycle for the top nozzles. When the top scum nozzles are working frequently because of the nature of the media, conversely a separate pump should be preferred.

The top scum and foam particles that accumulate in the vicinity of the periphery of the tank have the tendency to stick together and compact over the longer term. They must therefore be continually wetted and kept slippery, must be agitated when they combine, and adhesively adhering gas bubbles must be eliminated in order to reduce the buoyancy. Optionally, deflection into the vicinity of the surface must be possible.

Complete control over the entire reactor periphery is not technologically feasible since steel fermentation reactors are generally not designed for the fill level in the area of the roof slope in terms of strength. Thus, the free liquid surface corresponds to the cross-sectional area of the cylindrical reactor part.

According to an especially preferred embodiment of the invention, the problem is solved in that the top scum, which has been pushed together externally into a ring by the radial surface flow from the guide zone to the edge of the tank, is exposed hydraulically to free liquid jets by preferably at least one nozzle located tangentially on the periphery of the tank and is forced into circulation by means of the transferred pulses. In doing so, the top scum ring runs is moved through the jet zones where it is wetted and agitated in the desired manner.

The top scum outlet, attached radially (i.e., rectangular to the inner tank wall on the radius line from wall to tank center) to the inside wall of the tank with a drop pipe that can be pushed away at the level of the liquid surface, feasibly enables removal of floating material that can no longer be stirred into the suspension as necessary. The conditions can be adjusted by a change in the fill level in the bioreactor such that either the top scum rotates over the outlet or the material is pushed into the outlet box in batches.

To do this, preferably a nozzle with dimensions analogous to the bottom nozzles is located at a distance in front of the top scum outlet such that it washes the material into the outlet box with sufficient momentum.

Preferably, there is a second nozzle opposite that provides for movement and wetting. Advantageously, operation of the two nozzles likewise takes place cyclically.

In addition to the process for biological treatment of a suspension, the invention also relates to a device for biological treatment of a suspension with a bioreactor for receiving the suspension, in the interior of the bioreactor there being a guide means that extends into the vicinity of the bottom of the bioreactor with a vertical alignment for circulating the suspension.

Apparatus to perform the process comprises at least one nozzle for feeding a fluid into the bioreactor in the vicinity of the bottom of the bioreactor.

The nozzle can advantageously be supplied with the suspension via a feed line that is connected to the interior of the bioreactor and via a pump. Preferably, there are several nozzles distributed in the vicinity of the bottom on the periphery of the bioreactor. Here, the nozzles are preferably connected to a common pump. To compensate for the media-induced buoyancy forces, the nozzles are preferably arranged with a tilt angle from the horizontal of 0 to 10°.

A further development of the device according to the invention calls for the feed line connected to the interior of the bioreactor to also be connected to a nozzle located in the area of the intended suspension fill level for feeding fluid into the bioreactor. Here, the nozzle is advantageously arranged tangentially on the tank periphery. The nozzle is advantageously connected to the same pump as the nozzle that is located in the vicinity of the bottom of the bioreactor.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

The invention will be explained in more detail below based on the embodiments that are shown diagrammatically in the figures.

BRIEF DESCRIPTION OF THE DRAWING

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
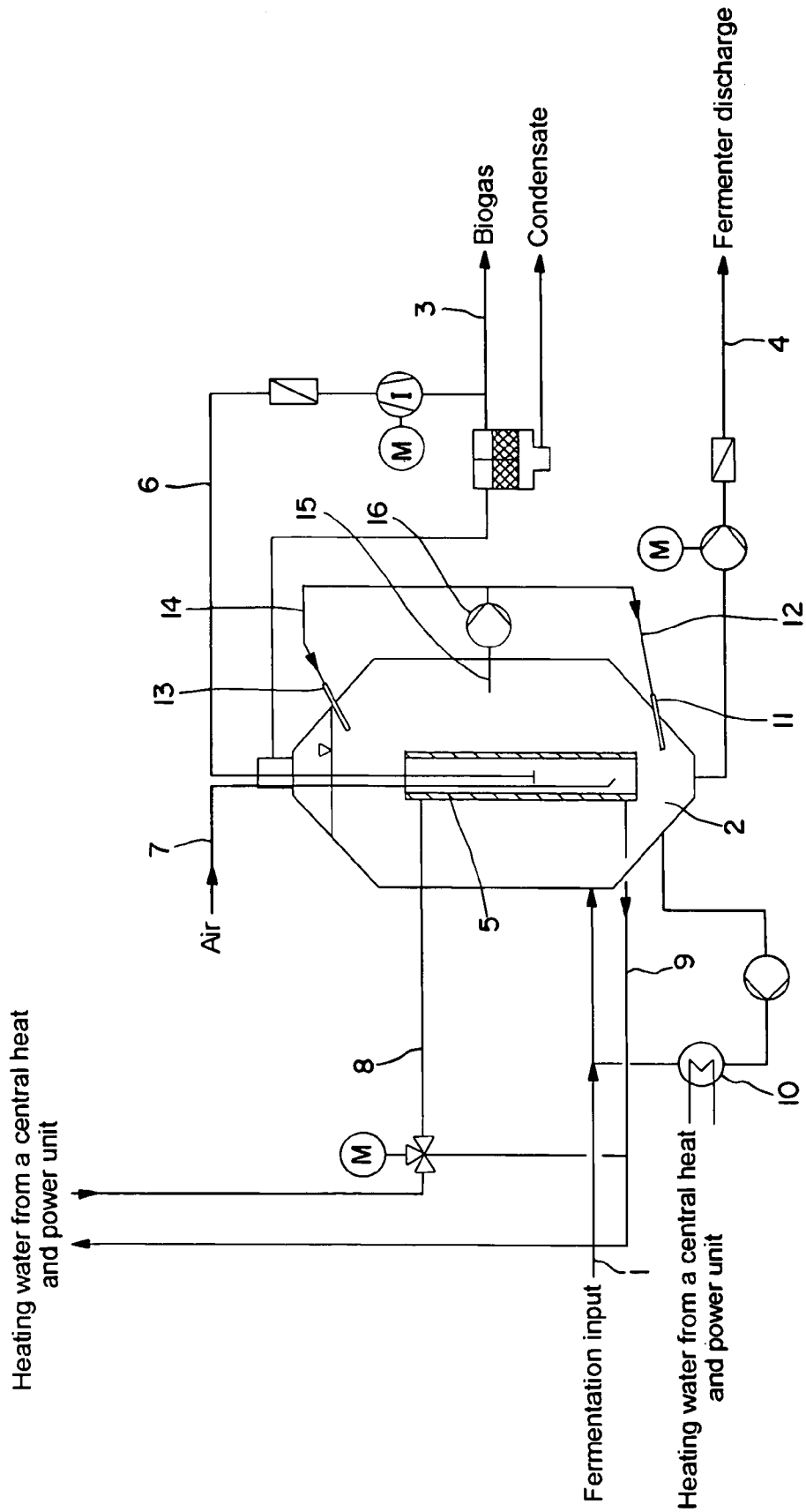
FIG. 1 shows a plant with a bioreactor according to the invention.

FIG. 1 shows, a plant for fermentation of wet garbage, for example. The wet garbage is processed in pretreatment steps, not shown in FIG. 1, whereby pulp or hydrolysate is formed. The pulp or hydrolysate is supplied to the bioreactor that is labeled as the fermentation reactor 2 via a line 1 as a suspension called the fermentation medium. In the fermentation reactor 2, methanation of the pulp or hydrolysate is carried out. To do this, the fermentation reactor 2 is kept under anaerobic conditions, and the contents of the fermentation reactor are circulated. The anaerobic biomass contained in the fermenting pulp or hydrolysate converts the organic substances partially into carbon dioxide and methane. The resulting biogas is drawn off from the fermentation reactor 2 via line 3.

Since the pulp or hydrolysate also contains sulfur compounds, $H_2S$ would also be formed without further measures and would be found again ultimately in the biogas. In order to minimize the undesirable $H_2S$ portions in the biogas, the entire contents of the fermentation reactor are transported through an oxygen-containing zone with sufficient contact time between the oxygen-containing gas and fermentation medium. For this purpose, the fermentation reactor 2 is made as a loop reactor with an inside loop in the form of a centrally and vertically arranged guide pipe 5 that acts as the oxygen-containing zone. Biogas is branched off from the biogas discharge line 3 via the biogas branch line 6 and pumped into the lower part of the interior of the guide pipe for use as a propellant gas. As a result of the decrease in the density of the mixture in the guide pipe 5 and the gas buoyancy force, the fermentation medium is conveyed through guide pipe 5 from bottom to top. In doing so, the hydraulic conditions are set by choosing the guide pipe geometry and the injected biogas flow, such that the entire contents of the fermentation reactor are preferably pumped at least twice per hour through the guide pipe 5. Air is metered into the inner ascending flow of the guide pipe 5 by means of an air feed line 7 in quantitative ratios such that the fermentation medium adequately acquires oxygen contact during passage through the guide pipe 5 in order to limit $H_2S$ formation in the metabolic processes in the desired manner. At the same time, the oxygen is decomposed biochemically to such an extent that there are no longer any oxygen portions that adversely affect the process in the biogas. The air demand can thus be minimized such that the nitrogen in the biogas does not lead to a significant diminishment of gas quality for further caloric use. To maintain an operating temperature that is optimum for biological treatment of the fermentation medium, the guide pipe 5 is made to be heated. To do this, the guide pipe 5 is, for example, provided with a double-walled jacket that has a feed line 8 and discharge line 9 for the heating water. In addition or alternatively, the contents of the fermentation reactor can be temperature-treated by means of an outside heat exchanger (not shown) through which the heating water flows.

To control the problem cases that occur specific to the media, especially sediment problems that arise for special sludge and waste qualities, a hydraulic jet system is superimposed on the gas-induced loop reactor principle. In this way, the process-engineering advantages of the loop reactor with a guide pipe 5 and gas injection 6 can be used, and at the same time problems that arise specific to the media can be solved without significantly increasing the addition of energy into the fermentation system. For this purpose, the fermentation medium is drawn off from the fermentation reactor 2 via line 15 and pump 16 and supplied to a nozzle 11 via line 12.

The fermentation medium as a free liquid jet is fed into the fermentation reactor 2 via the nozzle 11 at a nozzle velocity of 10 to 15 m/s and a volumetric flow rate of 300 to 600 m$^3$/h in the area near the bottom. In fermentation reactors with up to 8000 m$^3$ of reaction volume and diameters of up to 24 m, the necessary pulsed flow is produced in this way in order to have the liquid mass near the bottom rotate at roughly 0.5 m/s near the tank wall. Here, the nozzle 11 that has a diameter of 50 to 120 mm, depending on the tank size and the process parameters, is offset by 40° to 60° from radial flow in order to induce torque. A sufficient tilt angle of the nozzle 11 to the horizontal of 0 to 10° is employed to compensate for the media-induced buoyancy forces in the jet field. In practice, between two and five nozzles are arranged at corresponding distances on the periphery over the entire fermentation reactor tank circumference, depending on the reactor size. For the sake of clarity, FIG. 1 shows only one nozzle 11. All of the installed nozzles can be connected to a single pump, specifically the pump 16, and successively supplied from the latter by means of cyclic switching of the series. This makes possible an efficient and low-maintenance mode of operation.

In order to control top scum problems, a branch line 14 leads from the pump 16 to a nozzle 13 that is located on the fermentation reactor tank circumference near the surface of the suspension. The hydraulic connection of this nozzle 13 takes place via the pump 16 when the on cycles for the top nozzle are such that for each such on cycle one or two additional on cycles can be assigned to the bottom nozzles. When the nozzle 13 is working frequently because of the nature of the media, a separate pump is to be preferred. Like the nozzles 11 located in the vicinity of the bottom, it is also recommended that there be several nozzles 13 located near the surface of the suspension. For the sake of clarity, however, only one nozzle 13 is shown in FIG. 1.

In the above description, the bottom part of the reactor is below the bottom of the guide pipe 5.

Figure 2:
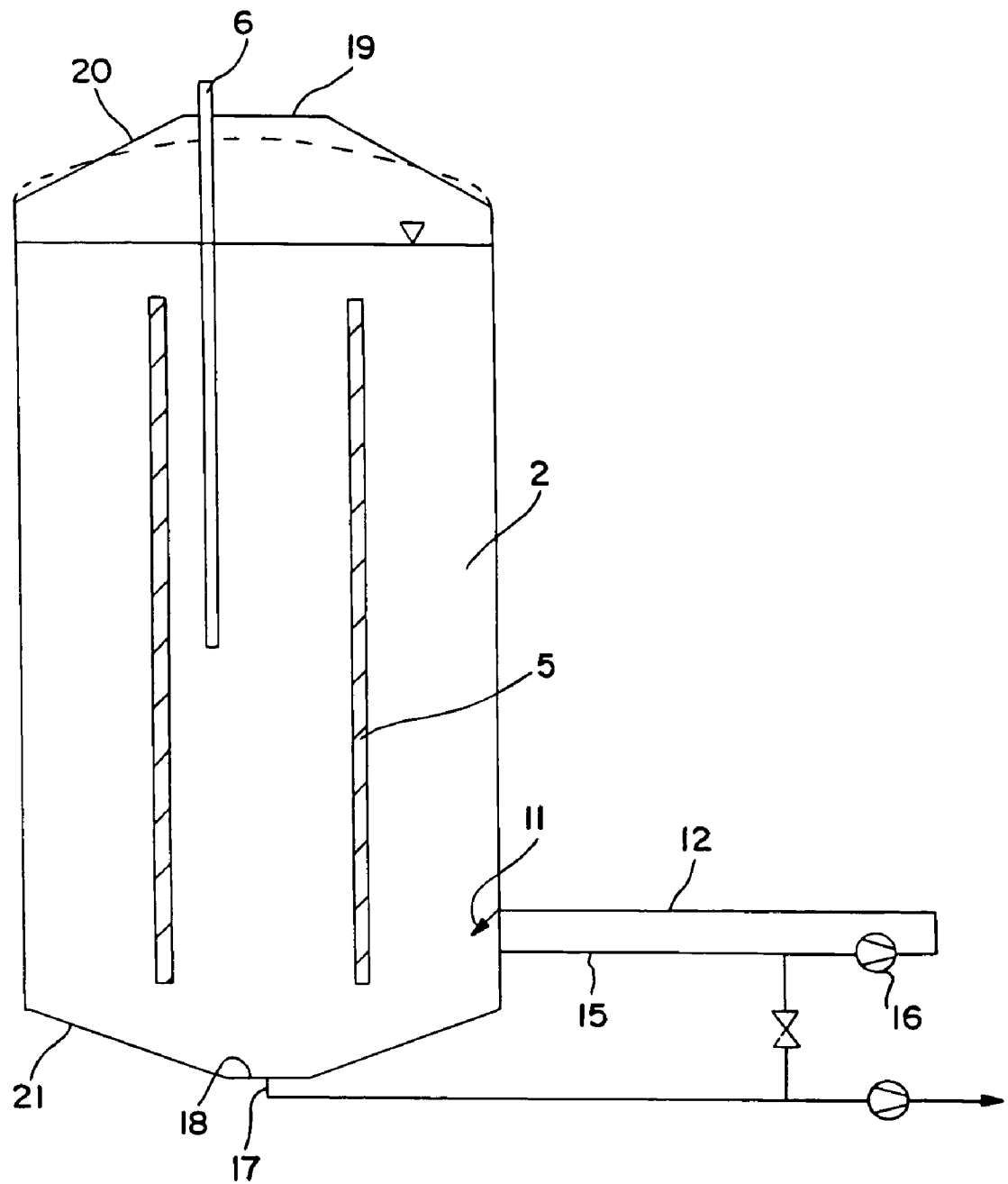
FIG. 2 shows a bioreactor according to the invention.

FIG. 2 illustrates in more detail an embodiment of the fermentation reactor described above. For sake of clarity, the numbers identifying corresponding elements in the figures are numbered identically. This fermentation reactor 2 has forced guidance of sediment and underbody removal.

Forced guidance is achieved by a bottom circulation system that produces horizontal rotary flow in the bottom area of the reactor. As described above, the fermentation medium/material is drawn off from the fermentation reactor via line 15 and pump 16 and supplied to a nozzle 11 via line 12.

To remove sediment, or optionally sediment with fermentation material, e.g., by underbody removal, the reactor contains a central bottom outlet 17. This outlet leads to a pipe which, once in the horizontal direction, is preferably an elbow-free pipe. The pipe crosses under the reactor to carry materials, for example, sediment, out from outlet 17.

The height of the cylindrical portion of the reactor, i.e., not including the top and bottom portions where the diameter narrows, is typically chosen to be 1.1 to 1.3 times more than the reactor's diameter, but is not restricted. For example, the height may be up to 2 times the reactor's diameter for certain applications. The ratio of the diameter of the reactor to the diameter of the guide pipe (5) is typically about 4:1 to 10:1. The bottom of the guide pipe is positioned about 1.0 to 1.5 meters above the central bottom outlet 17. The top of the guide pipe is positioned about 1.0 to 1.5 meters below the minimum level of fermentation material. Pipe 6 through which biogas is charged into the guide pipe may be immersed anywhere from about 6 to 14 meters below the level of fermentation material.

The top and bottom parts of the reactor are structured according to design conditions and are not restricted as illustrated herein. The shape of the top part, for example, can also be a curved top form as illustrated by the dashed line in FIG. 2. The bottom part of the reactor has a central flat floor surface 18. This surface has a diameter that is typically 4 to 8 times less than the diameter of the reactor. The top part of the reactor has a central service platform 19 that has a diameter that is 4 to 8 times less than the reactor's diameter. The sloped portion of the bottom 21, between the central flat floor 18 and the cylindrical portion of the reactor, and the sloped portion of the top 20, between the central service platform 19 and the cylindrical portion of the reactor, respectively, are each, independently, sloped at an angle of 0 to 20°, e.g., >0 to 20°. The bottom portion 21 is preferably integrated with the slope of the concrete floor, which accordingly has a complementary slope of 0 to 80°.

The space or gas volume (gas space) above the liquid in the tank is about 4 to 10% of the liquid volume. The pressure in the gas space is less than or equal to about 100 mbar.

The specific reactor illustrated has a nominal volume of 2376 m$^3$ with a maximum liquid volume of 2231 m$^3$, and is operated such that it has a preferred hydraulic dwell time of 20 days for the fermentation of communal sewage sludge.

In this specific reactor embodiment, the slope of the top part 20 is 12°, and the slope of the bottom part 21 is 10°. The diameter of the cylindrical portion of the reactor is about 13.4 meters. The central pipe has an inner diameter of 2.5 meters and a length of 12.0 meters. Pipe 6 delivering biogas is immersed about 12 meters into the fermentation material. Platform 19 has a diameter of 2.25 meters. The inlet of the bottom circulation system, e.g., to pipe 15, is 0.5 meters, and the outlet of said system, e.g., nozzle 11, is 0.7 meters above the bottom of the cylindrical portion of the fermentation reactor. The centrically flat floor and the centric service platform are each about 1.18 meters above and below, respectively, the cylindrical portion of the reactor. In this embodiment, the level of fluctuation for the fermentation material is about 0.78 meters, with the maximum level being about 0.58 meters below the top of the cylindrical portion of the reactor.

Figure 3:
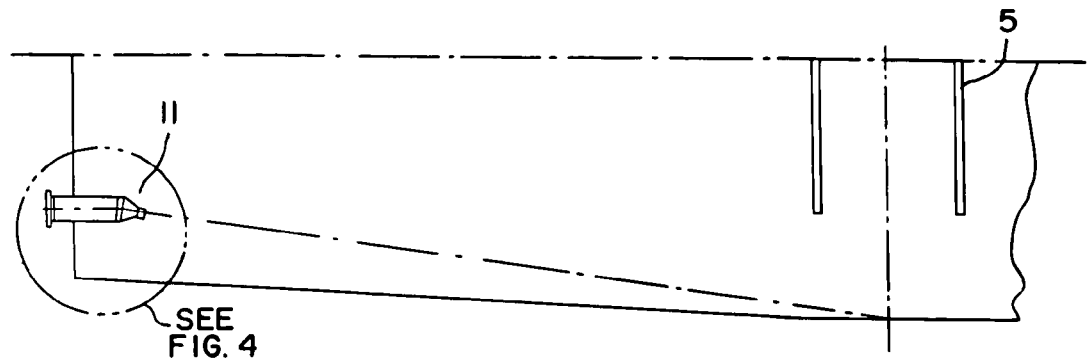
FIG. 3 shows a bottom fluid circulating nozzle viewed from the side.

FIG. 3 illustrates a side view of the bottom circulation system in more detail. The outlet of said system is equipped with nozzle 11 through which material from the fermentation reactor is pumped through to produce a horizontal rotary flow of the material in the reactor. For example, the nozzle in this embodiment produces a force of momentum of 1.0 kN.

Figure 4:
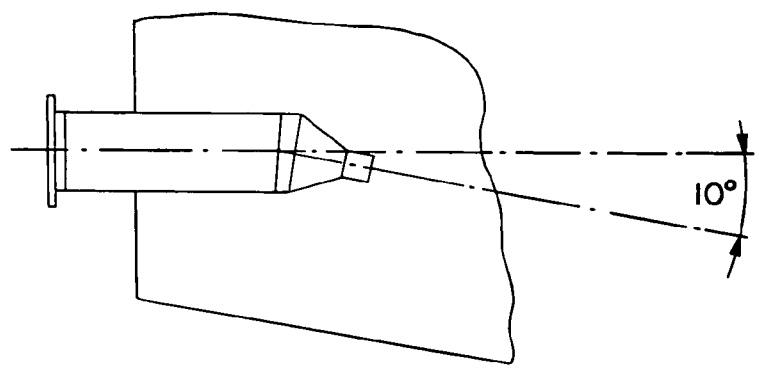
FIG. 4 shows a more detailed illustration of the nozzle from FIG. 3.

FIG. 4 illustrates a more detailed view of a nozzle of the bottom circulation system. In this embodiment, the nozzle is directed at an angle of 10 degrees below horizontal.

Figure 5:
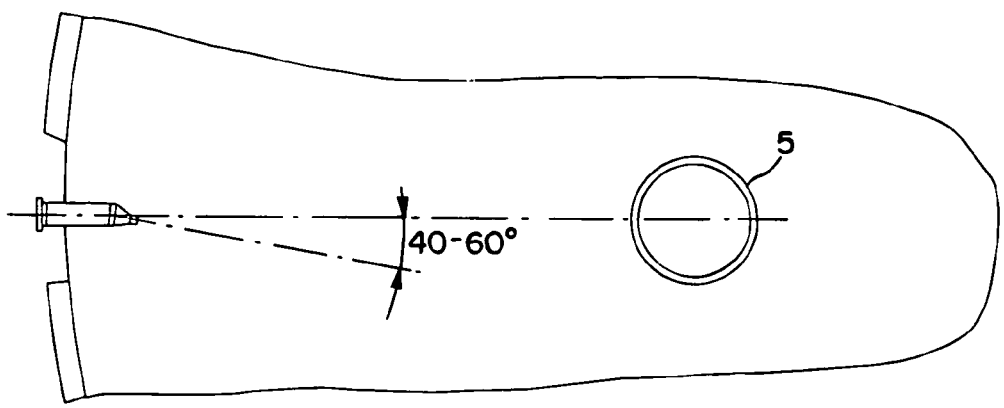
FIG. 5 shows a bottom fluid circulating nozzle viewed from the top.

FIG. 5 illustrates a top view of the bottom circulation system in more detail. The nozzle is directed 40-60 degrees from the radius, i.e., the line from the axis of the guide pipe 5 to the wall of the reactor.

The entire disclosures of all applications, patents and publications, cited herein and of corresponding German Application No. 103 58 400.5 filed on Dec. 23, 2002, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for biological treatment of a suspension in a bioreactor comprising a central outlet area near the bottom and a vertically aligned guide zone, said process comprising:
   circulating a suspension within said bioreactor, wherein at least some of the suspension is routed upward through said vertically aligned guide zone by the injection of gas into the vertically aligned guide zone, whereby a vertical flow of at least a portion of the suspension is produced downward outside of the vertically aligned guide zone; and
   feeding at least one jet of fluid at an angle of 0 to 10° downward from horizontal in the bottom part of the bioreactor, the jet superimposing on the downward vertical flow at the bottom part of the bioreactor, so as to establish a spiral flow to the central outlet area of the bioreactor.

2. A process according to claim 1, wherein the jet of fluid is fed into the bioreactor at a flow velocity of 10 to 15 m/s.

3. A process according to claim 1, wherein the jet of fluid is fed into the bioreactor at a volumetric flow rate of 300 to 600 m$^3$/h.

4. A process according to claim 1, wherein in the bottom part of the bioreactor at the bioreactor wall, the spiral flow has a flow velocity of about 0.5 m/s.

5. A process according to claim 1, wherein the jet of fluid is fed into the bioreactor at an offset angle to radial flow of 40 to 50°.

6. A process according to claim 1 wherein the fluid is fed into the bioreactor at an angle of >0 to 10° downward from horizontal.

7. A process according to claim 1, comprising withdrawing suspension from the bioreactor and recycling said suspension into the bioreactor via a nozzle as said at least one horizontal jet of fluid.

8. A process according to claim 1, wherein the jet of fluid is fed into the bioreactor via several nozzles distributed on the periphery of the bioreactor in the vicinity of the bottom.

9. A process according to claim 8, wherein the nozzles are supplied with a jet of fluid, at different times.

10. A process according to claim 8, wherein the nozzles are operated with a common pump and are successively supplied from said common pump by means of cyclic switching.

11. A process according to claim 7, wherein the suspension is suctioned off from the center of the bottom of the bioreactor.

12. A process according to claim 7, wherein fluid that is suctioned off from the bioreactor is fed into the bioreactor in part or in a time sequence via at least one upper nozzle to form a jet of fluid, the nozzle is provided in the area of the suspension fill level such that the surface of the suspension and/or the top scum floating on the surface of the suspension is forced into rotary flow.

13. A process according to claim 12, wherein the jet of fluid from the at least one upper nozzle is fed into the fermentation reactor via nozzles that are located tangentially on the periphery of the tank.

14. A process according to claim 13, wherein the upper nozzles are supplied from the same pump as the nozzles located in the vicinity of the bottom.

15. A process for biological treatment of a suspension in a bioreactor comprising a central outlet area near the bottom and a vertically aligned guide zone, said process comprising:
circulating a suspension within said bioreactor, wherein at least some of the suspension is routed upward through said vertically aligned guide zone by the injection of gas into the vertically aligned guide zone, whereby a vertical flow of at least a portion of the suspension is produced downward outside of the vertically aligned guide zone; and
feeding at least one jet of fluid at an angle of 0 to 10° downward from horizontal in the bottom part of the bioreactor, the jet superimposing on the downward vertical flow at the bottom part of the bioreactor, so as to establish a spiral flow to the central outlet area of the bioreactor,
wherein no moving parts are present in the bioreactor.

16. A process for biological treatment of a suspension in a bioreactor comprising a central outlet area near the bottom and a vertically aligned guide zone, said process comprising:
circulating a suspension within said bioreactor, wherein at least some of the suspension is routed upward through said vertically aligned guide zone by the injection of gas into the vertically aligned guide zone, whereby a vertical flow of at least a portion of the suspension is produced downward outside of the vertically aligned guide zone; and
feeding at least one jet of fluid at an angle of 0 to 10° downward from horizontal in the bottom part of the bioreactor, the jet superimposing on the downward vertical flow at the bottom part of the bioreactor, so as to establish a spiral flow to the central outlet area of the bioreactor,
wherein the means within said bioreactor for circulating the suspension, for providing the vertical flow, and for establishing said spiral flow to the central outlet area of the bioreactor consists essentially of the vertically aligned guide zone into which gas is introduced and the at least one jet of fluid at an angle of 0 to 10° downward from horizontal.

17. A process according to claim 15, wherein the jet of fluid is fed into the bioreactor via several nozzles distributed on the periphery of the bioreactor in the vicinity of the bottom.

18. A process according to claim 16, wherein the jet of fluid is fed into the bioreactor via several nozzles distributed on the periphery of the bioreactor in the vicinity of the bottom.

19. A process according to claim 15, comprising withdrawing suspension from the bioreactor and recycling said suspension into the bioreactor via a nozzle as said at least one horizontal jet of fluid.

20. A process according to claim 16, comprising withdrawing suspension from the bioreactor and recycling said suspension into the bioreactor via a nozzle as said at least one horizontal jet of fluid.

21. A process according to claim 15, wherein the jet of fluid is fed into the bioreactor at an offset angle to radial flow of 40 to 50°.

22. A process according to claim 16, wherein the jet of fluid is fed into the bioreactor at an offset angle to radial flow of 40 to 50°.

23. A process according to claim 15, wherein the fluid is fed into the bioreactor at an angle of >0 to 10° downward from horizontal.

24. A process according to claim 16, wherein the fluid is fed into the bioreactor at an angle of >0 to 10° downward from horizontal.

* * * * *